Marius Jean-Baptiste Barbarou
INVENTOR

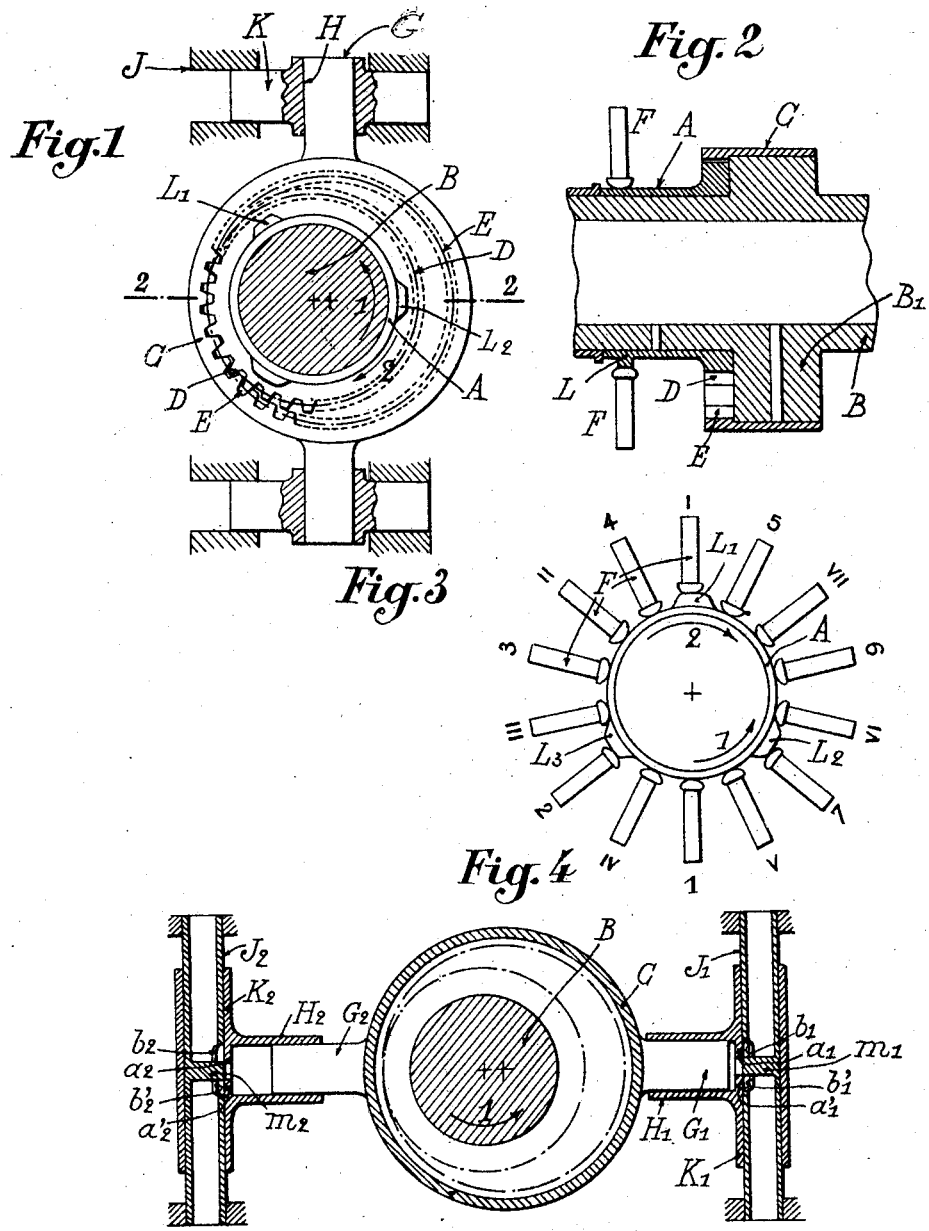

April 5, 1927. 1,623,041
M. J. B. BARBAROU
VALVE GEAR IN INTERNAL COMBUSTION ENGINES
Filed Oct. 5, 1926   3 Sheets-Sheet 3
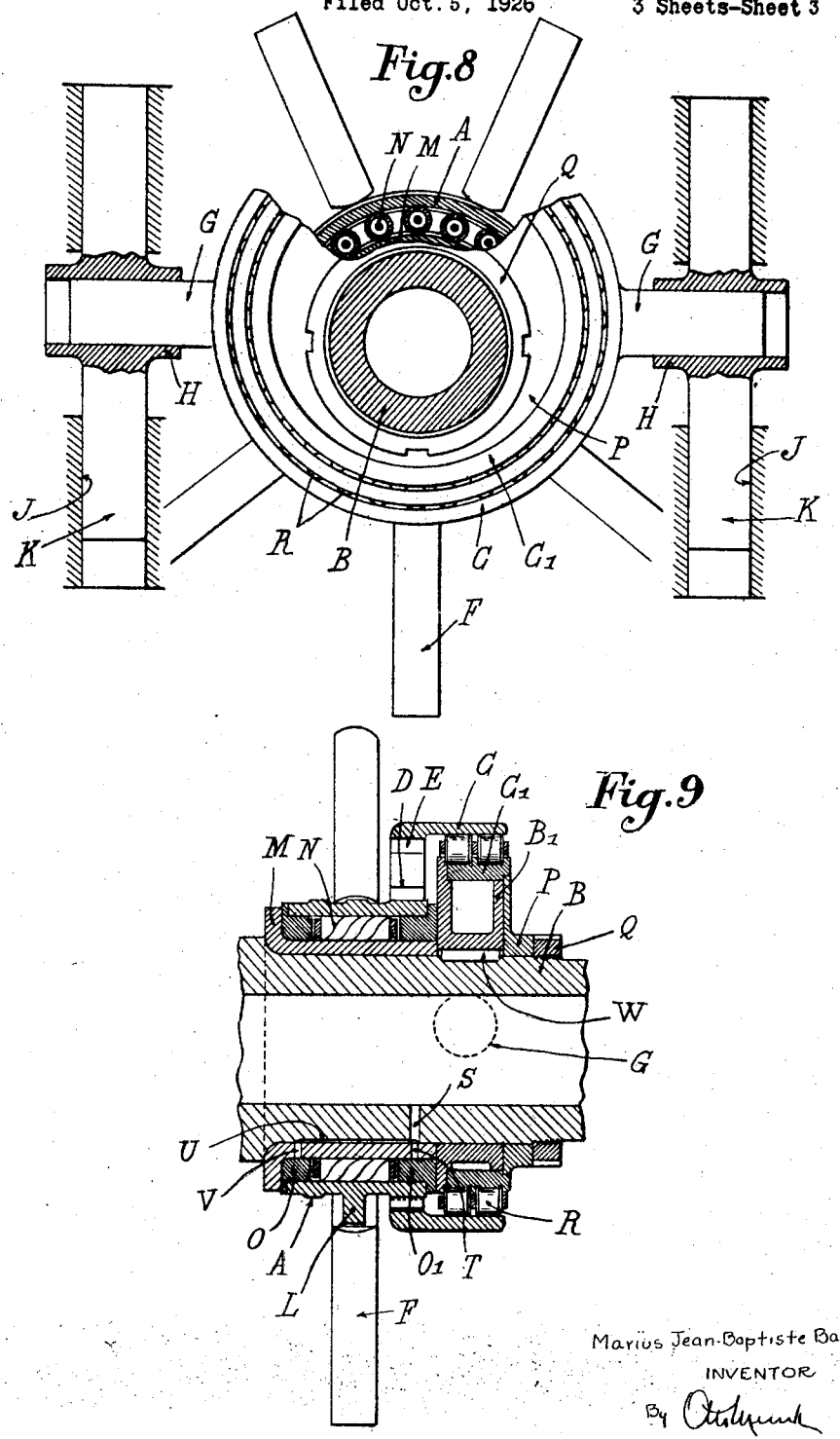
Marius Jean-Baptiste Barbarou
INVENTOR Patented Apr. 5, 1927.

1,623,041

UNITED STATES PATENT OFFICE.

MARIUS JEAN-BAPTISTE BARBAROU, OF PARIS, FRANCE.

VALVE GEAR IN INTERNAL-COMBUSTION ENGINES.

Application filed October 5, 1926, Serial No. 139,637, and in France February 3, 1926.

My invention relates to an improved controlling device for the valve gear of internal combustion engines having radially arranged cylinders, and chiefly for engines comprising an even number of cylinders, the said improvements having particularly for their object to diminish to a considerable degree the number of parts whereby the rotation of the crankshaft will be imparted to the shaft carrying the valve controlling cam, and further to reduce the number of surfaces in contact which have a relative movement of rotation and which thus require an accurate adjustment and an abundant lubrication.

The invention has further for its object the utilization of the alternating movements of the elements of the present device, which movements may be compared with those of a pump piston and of the valve gear of the same pump.

If such a pump is employed for lubricating or like purposes, the construction of the engine will be still further simplified.

One of the characteristic features of this invention consists in the fact that the surface of the valve-controlling cam, upon which are provided a plurality of bosses, is formed on the periphery of a sleeve which is loose on the crankshaft and is provided with an external toothed ring coacting with an internal toothed ring formed in the strap of an eccentric secured to the crankshaft, suitable means being provided to prevent all rotation of the strap by the said shaft.

According to another characteristic feature of the invention, the said strap comprises radial cylindrical parts of journals which are slidable in the interior of respective cylinders, each of the said cylinders communicating with a socket whose axis is perpendicular to the cylinder axis, the said socket being slidable on a stationary tube which is provided with ports for the passage of a fluid circulating in the said tube.

Finally, the invention relates to a practical embodiment of the invention which is chiefly characterized in that the cam sleeve is supported by the crankshaft by means of smooth rings and of roller bearings, the eccentric strap being supported through the medium of roller bearings.

The invention will be clearly understood with reference to the appended drawings, wherein:

Fig. 1 is a section of the valve controlling device by a plane perpendicular to the axis of the crankshaft, and Fig. 2 is a section of the same on the line 2—2 of Fig. 1.

Fig. 3 is a diagrammatic view of the general arrangement of the rods or valve lifts.

Figs. 4 to 7 are diagrammatic views of a pump combined with the controlling device, the object of the invention, showing different stages of operation.

Figs. 8 and 9 show by way of example a practical embodiment of the invention.

Figure 5:
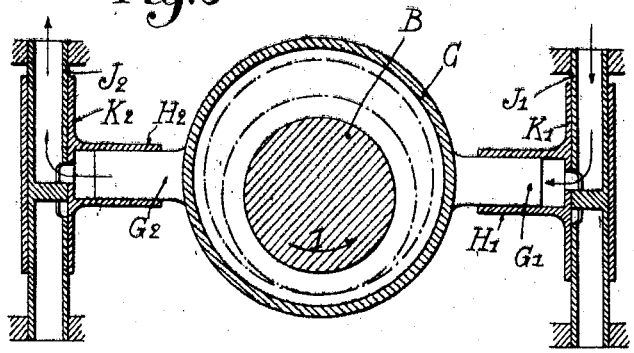

Referring chiefly to Figs. 1, 2, 3, 8 and 9, A is a sleeve mounted loose on the crankshaft B; an eccentric $B^1$ is made integral with or is separately secured in any suitable manner to the crankshaft. Upon the eccentric $B^1$ is loosely mounted a strap C carrying an internal toothed ring E co-acting with an outer toothed ring formed on the periphery of the sleeve A. This latter is provided with a certain number of bosses, three being shown in the drawings, $L^1$, $L^2$, $L^3$.

The ends of the rods or valve lifts F, which are all disposed in the same plane, are in contact with the sleeve A, and are raised at the proper time by the bosses $L^1$, $L^2$, $L^3$.

To avoid the rotation of the strap C, this latter is provided with one or more projecting parts G which extend radially and are slidable in the respective guides H formed in the members K, which latter are also slidable in the respective stationary guides J which are perpendicular to the guides H.

Obviously, the invention is not limited to this particular guiding arrangement, and the strap C may be simply provided with a lug or stop which comes into contact, during the motion of the crankshaft, with a stationary stop, the surfaces of the said lug and stop being such as to provide for a relative sliding motion of these latter.

The two projecting parts G are not necessarily in the diametrically opposite position, and the guides, which are preferably cylindrical, may be given a polygonal form.

It will be easily understood that since the crankshaft rotates in the direction of the arrow 1, the sleeve C which is held against rotation will assume a circular translation motion; the ring E will draw forward the ring D of the sleeve A which assumes a movement of rotation relatively to the crankshaft. This motion takes place according to the arrow 2, i. e. contrary to the motion of the shaft B, and the speed of this motion depends upon the speed of this shaft and of the ratio of the gear formed by the rings D, E.

Let it be supposed that the said controlling device is to be used for the valves of an engine having cylinders in star disposition and comprising two sets of seven cylinders each, the two sets being spaced through 180 degrees from one another. In an engine of this class, it is well known that the ignition must take place in the following order (Fig. 3):

I, 7, III, 5, V, 3, VII, 1, II, 6, IV, 4, VI, 2, I and so on.

Since all the valve rods are in the same plane, and supposing, as shown in the drawing, that the sleeve A carries three bosses, the boss $L^1$ will raise the valve rod of the cylinder I, the boss $L^2$ will then raise the valve rod of the cylinder 7, the boss $L^3$ will then raise the valve rod of the cylinder III, the boss $L^1$ will then raise the valve rod of the cylinder 5, and so on.

Obviously, the length of the bosses will be calculated in such manner that the valves will be opened for the proper length of time.

The ratio of the gearing D and E, i. e. the speed of rotation of the sleeve A, will be determined in the following manner:

Each boss of the cam raises 14 valve lifts during one revolution of the sleeve A, so that there will be produced $3 \times 14 = 42$ ascents per revolution of the sleeve. But for two revolutions of the crank shaft, provision must be made for 14 ascents, or 7 per revolution. Thus the speed of the said sleeve A must be $42:7=6$ times less than the speed of the crankshaft, and in the direction contrary to the rotation of the latter.

Since the speed of the sleeve A relatively to the crankshaft is equal to 7/6 the speed of the latter, it will be noted that the gear ratio between E and D must be equal to 7/6.

It is evident that the method would be the same in the case of a different number of cylinders or of cams.

As above remarked, the alternating motion of the extension parts G may be utilized to realize for instance an oil pump.

In this event (Figs. 4 to 7), the extension part G has a cylindrical shape and forms a plunger which is movable in a cylinder H communicating with a socket K whose axis is perpendicular to the axis of the cylinder. The axial motion of the said socket is guided by a tube J in which the lubricating oil is circulated. The partitions $m^1$, $m^2$ divide the tubes J into two parts whereof one is connected with the oil tank and the other to the parts to be lubricated. In the drawings, it is supposed that the left-hand tube $J^2$ is connected at the lower end with the oil tank, and at the upper end with the parts to be lubricated, the contrary arrangement being employed for the right-hand tube $J^1$.

The respective apertures $b_1$, $b'_1$, $b_2$, $b'_2$ on either side of the partitions $m^1$, $m^2$ connect the interior of the tubes $J^1$ $J^2$ with the respective cylinders $H^1$, $H^2$.

The bottom of the cylinders $K^1$ and $K^2$ comprise the parts $a_1$, $a'_1$, $a_2$, $a'_2$ whose length is such that they will completely close all the apertures $b_1$ etc. in the position in which the pistons $G^1$ $G^2$ are at one end of their stroke.

The operation of the said device is as follows:

Starting from the position shown in Fig. 4, it is observed that the pistons $G^1$ $G^2$ are at one end of their stroke and that the apertures $b^1$ etc. are covered by the parts $a_1$, etc.

Since the crankshaft rotates according to the arrow 1, the strap C will rise, and its horizontal eccentricity will diminish. The sockets $K^1$, $K^2$ will rise along the tubes $J^1$ $J^2$ in such manner that while the apertures $b'_1$, $b'_2$ are covered by the parts $a'_1$, $a'_2$, the apertures $b_1$ $b_2$ will be cleared from the parts $a_1$, $a_2$. At the same time, the piston $G^2$ forces the oil contained in the cylinder $H^2$ to the parts to be lubricated, and the piston $G^1$ withdraws from the cylinder $H^1$ the oil entering through the tube $J^1$ (Fig. 5).

Figure 6:
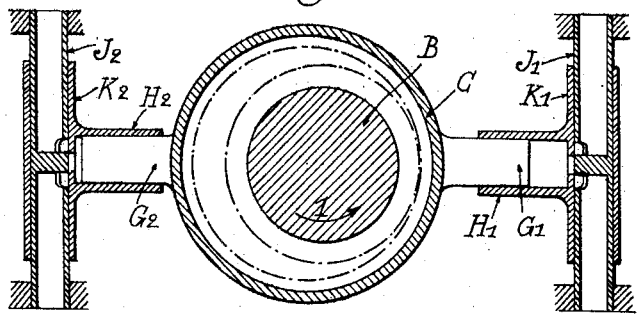
Figure 7:
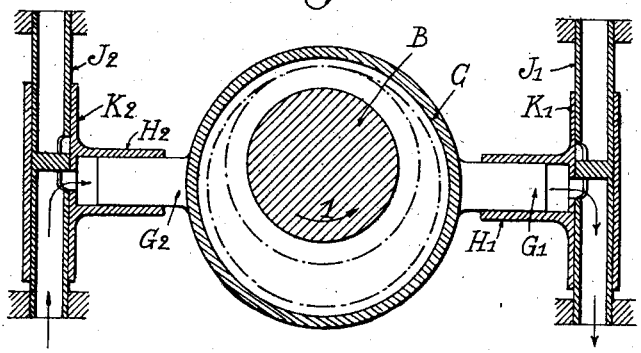

In Fig. 6, it will be noted that the pistons are at the other end of their stroke, and their position is the contrary to that shown in Fig. 4.

The crankshaft being still rotating, it will be seen (Fig. 7) that the slide valves formed by the sockets $K_1$—$K_2$ co-acting respectively with the apertures $b'_1$ and $b'_2$ of the tubes $J^1$ and $J^2$, now connect the cylinder $H^2$ with the suction tube, and the cylinder $H^2$ with the discharge tube.

Obviously, the suction and the discharge tubes may be connected in such manner as to obtain a continuous circulation of oil. Further a greater number of pistons may be provided upon the periphery of the strap G.

Figs. 8 and 9 show by way of example a practical embodiment of the invention.

In these latter figures M is a ring formed of cementation steel, which is tightly fitted upon the shaft B and serves as the internal roller race for the rollers H which are interposed between the ring M and the sleeve A. The rings O $O^1$ of anti-friction metal also serve for the mounting of the sleeve A and absorb, concurrently with the rollers N, the shocks of the valve rods F upon the bosses L formed upon the sleeve A, said rings O—$O^1$ rotating at the same speed as the said sleeve.

To the shaft B is keyed an eccentric $B^1$ which is preferably hollow so as to reduce its weight, the key being shown at W. The said eccentric is axially maintained by means of a nut Q screwed upon the shaft B, with the interposition of the plate P.

Upon the eccentric B¹ is tightly fitted the ring forming the internal roller path C¹ of the second roller bearing R, and the ring is also held in place by the plate P. The external roller path consists of the strap C, it being held by the extension parts G which prevent its rotation as well as its axial motion.

To provide for the lubrication of the device, the oil, which is supplied under pressure to the hollow crankshaft, will enter the radial duct S communicating with a longitudinal groove U which supplies the oil to the radial conduits T and V through the ring M; in this manner the oil lubricates the contact surfaces of the ring M and the rings O O¹. The oil which leaks laterally will then lubricate the rollers N, which are preferably provided with helical oil grooves.

A portion of the oil circulates between the ring O₁ which is movable with reference to the eccentric B¹, and this oil will lubricate the rollers R and the gearing D—E, It will be noted that the cam sleeve A, which supports the shock of the valve rods F, is held both by the roller bearing N and the rings O—O¹, so that these latter will not be subjected to an excessive wear, and they will also relieve the said rollers, so that the device can be lubricated in very good conditions and the power lost by friction can be reduced to a minimum.

Obviously, the invention is not limited to the constructional arrangements herein described and represented, and therefore susceptible of various modifications without departing from the scope of the invention.

Having now described my said invention, I declare that what I claim as new and desire to secure by Letters Patent is:

1. In a valve gear for an internal combustion engine with radially arranged cylinders: a valve controlling cam mounted loose on the crankshaft of the engine, an eccentric rotating with said crankshaft, a strap cooperating with said eccentric, means for guiding said strap and whereby a circular translation motion is imparted to the same and means for operatively connecting said strap with said cam and whereby the latter is given a relative rotary motion with respect to said crankshaft.

2. In a valve gear for an internal combustion engine with radially arranged cylinders: a valve controlling cam sleeve mounted loose on the crankshaft of the engine, an eccentric rotating with said crankshaft, a strap cooperating with said eccentric, two toothed rings respectively secured to the outer periphery of said sleeve and to the inner periphery of said strap and meshing with one another and means for guiding said strap and whereby a circular translation motion is imparted to the same.

3. In an internal combustion engine with radially arranged cylinders: a valve controlling cam mounted loose on the crankshaft of the engine, an eccentric rotating with said crankshaft, a strap cooperating with said eccentric, means for guiding said strap in two directions at right angles to each other and means for operatively connecting said strap with said cam and whereby the latter is given a relative rotary motion with respect to said crankshaft.

4. In an internal combustion engine with radially arranged cylinders: a valve controlling cam mounted loose on the crankshaft of the engine, an eccentric rotating with said crankshaft, a strap cooperating with said eccentric, means for operatively connecting said strap with said cam and whereby the latter is given a relative rotary motion with respect to said crankshaft, guiding extensions secured to said strap, bearings for said extensions and wherein the latter are adapted to move in a pistonlike manner, means for guiding said bearings in a perpendicular direction, a source of fluid, a delivery piping for said fluid and means whereby the relative motion of said extensions and bearings is used for circulating said fluid from said source to said delivery piping.

5. In an internal combustion engine with radially arranged cylinders: a valve controlling cam mounted loose on the crankshaft of the engine, an eccentric rotating with said crankshaft, a strap cooperating with said eccentric, means for operatively connecting said strap with said cam and whereby the latter is given a relative rotary motion with respect to said crankshaft, guiding plungers secured to said straps, bearings for said plungers and wherein the latter are adapted to move in a pistonlike manner, a source of fluid, a delivery piping for said fluid, two hollow supports for each of said bearings and respectively connected with said source of fluid and with said delivery piping, each bearing being adapted to slide upon the respective supports in a direction at right angle with the direction of the alternating motion of the plunger within said bearing and means whereby the interior of each bearing is alternately connected with the interior of the corresponding two supports and said fluid is circulated from said source to said delivery piping.

6. In an internal combustion engine with radially arranged cylinders: a valve controlling cam mounted loose on the crankshaft of the engine, an eccentric rotating with said crankshaft, a strap cooperating with said eccentric, means for operatively connecting said strap with said cam and whereby the latter is given a relative rotary motion with respect to said crankshaft, guiding plungers secured to said strap, bearings closed at one end for said plungers and wherein the latter are adapted to move in a pistonlike manner, a source of fluid, a delivery piping for said fluid, a hollow support for each of said bearings and having its ends respectively connected with said source of fluid and with said delivery piping, each bearing being adapted to slide upon its support in a direction at right angle with the directions of the alternating motion of the plunger within said bearing, a cross partition within said support, inlet and outlet ports for said fluid provided through the support wall and on either side of said partition and an opening through the end wall of each bearing and adapted to register successively with said ports of the respective support.

7. In a valve gear for an internal combustion engine with radially arranged cylinders as claimed in claim 1, the combination of: a hollow engine crankshaft, a roller bearing mounted on said crankshaft and two smooth rings disposed on either side of said bearing, for loosely supporting said cam, a roller bearing whereby said eccentric strap is supported by said eccentric, and lubrication ducts provided through said crankshaft and the inner ring of said first mentioned roller bearing.

In testimony whereof I have signed my name to this specification.

MARIUS JEAN-BAPTISTE BARBAROU.